United States Patent [19]

SooHoo

[11] Patent Number: 4,921,354

[45] Date of Patent: May 1, 1990

[54] IDENTICAL SERVO FREQUENCY MODULATED PASSIVE RING LASER GYROSCOPE

[75] Inventor: Kie L. SooHoo, Anaheim, Calif.

[73] Assignee: Rockwell International Corporation, El Segundo, Calif.

[21] Appl. No.: 28,833

[22] Filed: Mar. 23, 1987

[51] Int. Cl.[5] .............................................. G01C 19/64
[52] U.S. Cl. ...................................... 356/350; 372/94
[58] Field of Search ...................... 356/350; 372/94, 97

[56] References Cited

U.S. PATENT DOCUMENTS 4,673,293 6/1987 Sanders ............................... 356/350

FOREIGN PATENT DOCUMENTS 0146587 12/1978 Japan ................................... 356/350

Primary Examiner—Vincent P. McGraw
Assistant Examiner—S. A. Turner
Attorney, Agent, or Firm—H. Fredrick Hamann; George A. Montanye; James F. Kirk

[57] ABSTRACT

A phase locked passive ring resonator gyroscope comprising a fixed frequency reference signal generator (Fm); a single piece body having laser and passive resonator cavities; a laser means using the laser resonator cavity responsive to a laser control signal from a laser servo for providing a single frequency light source (F0) for frequency modulating the single frequency light source to form a light source (F0) and having respective upper and lower side bands at frequencies F0+Fm and at F0−Fm; first and second voltage controlled oscillator means responsive to respective first and second control signal for frequency shifting the first and second frequency modulated ray center frequencies by a first and second variable offset frequencies to form a propagating and counterpropagating light sources; the second resonator cavity being a passive high Q evacuated cavity; a detector means for detecting a first offset frequency error signal and for detecting a second offset frequency error signal; cavity servo means responsive to the first and second offset frequency error signals from the detector means for providing, a first control signal to the first voltage controlled oscillator means for frequency shifting the first frequency modulated ray by a first variable offset frequency to maintain the propagating light beam in the second resonator at peak resonance and to provide a second control signal to the second voltage controlled oscillator means for frequency shifting the second frequency modulated ray by a second variable offset frequency (F2) to control and maintain the counterpropagating light beam (FCCW) at peak resonance; means for constantly adjusting the passive cavity path length servo signal to keep the passive cavity at peak resonance at a frequency substantially mid-range between the propagating and the counterpropagating beams; output counter means for measuring and outputting the frequency difference between the first variable offset frequency (F1) and the second variable offset frequency (F2), the measured frequency difference representing the difference in frequency due to an input gyro body rate about the gyro sensitive axis.

10 Claims, 12 Drawing Sheets

IDENTICAL SERVO FREQUENCY MODULATED PASSIVE RING LASER GYROSCOPE

BACKGROUND OF THE INVENTION

1. Field of the Invention

The present invention relates to optical gyroscopes and more particularly to passive ring resonator gyroscopes which have bias and frequency errors resulting from mechanically or thermally induced dimensional changes.

2. Description of Prior Art

This application relates to four previously submitted applications, Ser. No. 676,322, "PASSIVE RING RESONATOR GYROSCOPE", our Docket No. 84E005, filed 11/29/84, inventor Sanders et al; Ser. No. 701,891, "TWO SERVO LOOP PASSIVE RING LASER GYROSCOPE", our Docket No. 84E040, filed 2/13/85, inventors SooHoo and Valle; and Ser. No. 839,292, "TWO SOURCE LASER PASSIVE RING LASER GYROSCOPE", our Docket No. 85E017, filed 3/13/86, inventor SooHoo, and Ser. No. 864,232, "PHASE LOCKED PASSIVE RING LASER GYROSCOPE", our Docket No. 85E033, filed May 19, 1986, inventor SooHoo, and all having common assignee.

All four of these applications, describe a laser gyro having a single piece body incorporating a linear laser light source and a passive resonant cavity. The first application, Ser. No. 676,322, relies on three active servo loops for operation.

The second previous application, Ser. No. 701,891, describes a gyroscope having a single linear laser light source and a passive resonant cavity. This second gyro uses a first and second active servo loop for operation.

The third application, Ser. No. 839,292 describes a gyroscope having two laser sources. A first laser source produces a clockwise beam and a second laser source to produces a counterclockwise beam. Both beams circulating in a sealed, evacuated passive cavity within the same body.

The fourth application, Ser. No. 864,232 describes a gyroscope using an external modulator to frequency modulate the input source beam and subsequently the detected clockwise and counterclockwise beams are demodulated at this same frequency to produce a more sensitive phase detection scheme.

In a passive ring resonator gyroscope, a pair of monochromatic light beams counterpropagate about a closed-loop optical path, which forms a high Q resonant optical circuit. The stability of the path length between reflective surfaces forming the closed path is critical in maintaining resonance in the passive ring resonator cavity since dimensional changes contribute to bias frequency errors. A linear laser[1] and a ring resonator to form a prior art passive ring resonator is depicted in an article by S. EZEKIEL and S. R. BALSAMO titled "A Passive Ring Laser Gyroscope", *Applied Physics Letters,* Vol. 30, No. 9, 1 May 1977, pg. 478–480. A linear resonator is typically conceived as a linear or standing wave resonator with forward and backward waves in which a light completes an optical round trip by reflecting off a mirror and retracing its path. The forward and backward waves create a standing wave in the cavity. In a ring resonator, each light completes an optical round trip without retracing its path and hence the path encloses an area as shown in Ezekiel's paper.)

[1]For description of lasers and resonators refer to: Yariv, A., *QUANTUM ELECTRONICS* (John Wiley & Sons, 1975) or Sargent, M., et.al., *LASER PHYSICS* (Addison-Wesley Pub., 1974).

In the passive ring resonator, such as that described in the EZEKIEL reference, two beams traveling in opposite directions around the closed-loop optical path are injected into the passive ring resonator from a single frequency light source. The single frequency light source for the passive resonator is typically an external linear laser. *Spectra Physics Inc.* of Sunnyvale, CA. produces stabilized lasers with the required characteristics. As the ring resonator gyroscope cavity rotates in inertial space, the two counterpropagating beams travel unequal path lengths. This path difference, due to rotation in inertial space, gives rise to a relative frequency difference (Sagnac effect[2]) between the two counterpropagating beams.

[2]E. J. Post, "Sagnac Effect", *Review of Modern Physics,* Vol. 39, No. 2, April 1967, p. 475–493.

A ring resonator, as opposed to a linear resonator, can exhibit the Sagnac effect and detect inertial rotation. The relative frequency difference is detected as a changing interference fringe pattern which is then electronically interpreted to indicate the direction and inertial rate of rotation of the passive gyro about the gyro's sensitive axis. The sensitive axis of the gyro is along the direction normal to the plane of the passive resonator.

It is known that bias errors in the detected signal of a ring resonator gyro result from dimensional changes in the laser and in the passive ring resonator. Bias errors also result from Fresnel Drag; these errors arise from the presence of gases (e.g. air) in the path of the counterpropagating beams in the resonator. Bias errors are typically characterized as a frequency difference between the two light beams which is not related to the rotation rate. Bias errors are sometimes detected as a frequency difference in the absence of rotation or as post calibration changes in the frequency difference for a specific absolute inertial rotation rate.

The Passive Ring Resonator Gyroscope of the type described in the EZEKIEL reference is typically constructed by placing optical elements, such as mirrors, beamsplitters, etc. on an optical bench. The location, spacing and geometrical relationships between the elements of the gyro function to enhance the passive ring resonator gyroscope's sensitivity and stability. Experimental passive ring resonator gyroscopes, such as that described in the EZEKIEL reference, typically have path lengths of a few meters making them unsuitable for use as a navigational instrument. The large size of prior art passive ring resonator gyroscopes, such as that characterized in the EZEKIEL reference, also contributes to the likelihood of bias errors due to mechanical coupling and mechanical drift of the optical elements in response to physical and thermal forces acting on the laser and on the cavity optical table or bench.

U.S. Pat. No. 4,352,562 issued Oct. 5, 1982, inventor H. T. Minden, is related and of interest; however, this reference shows no tuning mechanism, and has a different frequency modulation scheme. No EO coupler is used.

SUMMARY OF THE INVENTION

The objective of this invention is to provide a phase locked passive ring resonator gyro suitable for use as a navigational instrument having reduced bias errors and bias error sensitivity while having substantially enhanced stability and sensitivity. This is accomplished by constructing a gyro having a single source laser and a ring resonator within a single housing or one piece body in which the total resonator path length is substantially below a half meter.

Another objective of this invention is to provide a single source passive ring laser gyroscope using two identical phase locked tracking servos for peaking the intensity of the CW (clockwise) and CCW (counter-clockwise) propagating light beams in the passive cavity.

Another objective of the invention is to change the passive cavity's path length with a control signal to achieve resonance locking of the cavity at a frequency midway between the CW and CCW resonances without the need for periodic AC modulation of the passive cavity's path length.

A particular embodiment of this innovative passive ring resonator gyroscope has a single piece body, typically fabricated from a block of glass ceramic material such as ZERODUR ®, (a trademark of the JENA$^{ER}$ GLASSWERK SCHOTT & GEN. of MAINZ, GERMANY), which forms a fixed reference frame for all required optical elements, including first and second resonator cavities. A laser means is composed of a linear or "L" shaped laser that uses the first cavity. This laser, when operated with suitable excitation, functions as a linear laser providing a source of single mode TEM$_{oo}$, single frequency light for the third resonator cavity.

In a more particular alternative embodiment, the laser means, first resonator cavity has a transmitting optical port for transmitting stabilized single frequency light to the second resonator cavity. The internal body-mounted reflective surfaces are coupled to and mechanically spaced by the single piece body. A gain medium, such as a Helium Neon gas mixture is contained in the first resonator cavity but the second cavity is evacuated.

A means for exciting the gain medium, including a power source, to induce lasing in the first resonator cavity is provided. The output of the single frequency light sources is directed through at least one transmitting optical port of the laser resonator. A laser cavity adjusting servo samples the single frequency light source and adjusts the cavity to provide the single frequency light source.

The second resonator cavity and its reflective elements form a passive high Q cavity having a closed optical path tuned to resonate at substantially the same frequency as the first resonator cavity. Means are provided for modulating the frequency of the light source and means are provided for splitting this source into first and second rays and coupling the first and second rays into the second passive resonator cavity, thereby forming CW and CCW light beams in the second resonator. These means are implemented using conventional beamsplitters, mirrors, and lenses.

Bias errors are diminished since the passive ring resonator is a passive device and has no internal excitation to frequency shift the cavity resonances. Bias errors due to axial gas flow or Fresnel drag is eliminated since the second resonator is evacuated. Taken together, these features form a gyroscope with increased stability and reduced bias errors.

A source laser cavity servo controls the resonant frequency of the laser light source by sampling the intensity and locking the source laser to a fixed level. The first and second identical cavity servo loops are synchronized with a first oscillator that frequency modulates light leaving the laser via an electro-optic modulator over a frequency spectrum of +/−40 MHz at a frequency Fm of typically 10 MHz. The first oscillator also provides a reference signal to a first and second phase-sensitive detector to obtain a first and second demodulated error signal for integration. The first and second integrated error signals from a first and second integrator are summed to provide a cavity path length control signal for the passive resonator.

The laser cavity has a laser cavity path length adjusting means such as a piezoelectric transducer responsive to the laser cavity path length control signal for shifting the resonant frequency of the laser cavity. The first cavity path length adjusting means shifts the frequency of the single frequency light source in response to the integrated intensity error signal applied to the PZT. After passing through the electro-optic modulator, the laser light is divided into two beams, CW and CCW by a beamsplitter. The frequency of the CW beam is up-shifted by an acousto-optic modulator (AO1) driven by a voltage controlled oscillator (VCO1) at F1 before it is injected into the second resonator.

The VCO adjusts its output frequency in response to a first servo control signal and adds enough of a frequency increase to the Fm modulated laser light source to shift the center frequency of the FCW beam entering the first cavity to the first cavity (passive resonator) line width resonant point. A portion of the CW beam is extracted from the resonator and a photodetector responds to the beat signal at the frequency of the Fm signal. The Fm signal thus extracted is coupled to a first phase sensitive detector, also referenced to the first oscillator. If the upshifted frequency modulated light source, FCW, is above or below the line center of the CW cavity resonance, the first phase sensitive detector develops an error signal having a magnitude related to the CW frequency error and a polarity related to the position of the error above or below the cavity's CW peak resonance.

The frequency of the CCW beam is shifted by F2 by an acousto-optic modulator (AO2) driven by a voltage controlled oscillator (VCO2). The VCO2 adjusts its output frequency in response to a second servo control signal and adds enough of a frequency increase to the Fm modulated laser light source to shift the center frequency of the FCCW beam entering the second cavity to the second cavity (passive resonator) line width resonant point. A portion of the CCW beam is extracted from the resonator and a photodetector responds to the beat signal at the frequency of the Fm signal. The Fm signal thus extracted is coupled to a second phase sensitive detector, also referenced to the first oscillator. If the upshifted frequency modulated light source, FCCW, is above or below the line center of the CCW cavity resonance, the second phase sensitive detector develops an error signal having a magnitude related to the CCW frequency error and a polarity related to the position of the error above or below the cavity's CCW peak resonance.

In this embodiment, a means for detecting the frequency difference between a clockwise upshift VCO1 oscillator and a counterclockwise VCO2 upshift oscillator provides a signal representing a measure of the input body rate.

BRIEF DESCRIPTION OF THE DRAWINGS

FIG. 11b shows a wave form represents the output voltage response from a phase sensitive detector as the laser source is tuned over a range extending from (Fo−Fm) to (Fo+Fm) while the passive resonator is tuned to resonate at a relatively fixed frequency Fo.

DESCRIPTION OF THE PREFERRED EMBODIMENT

Figure 1:
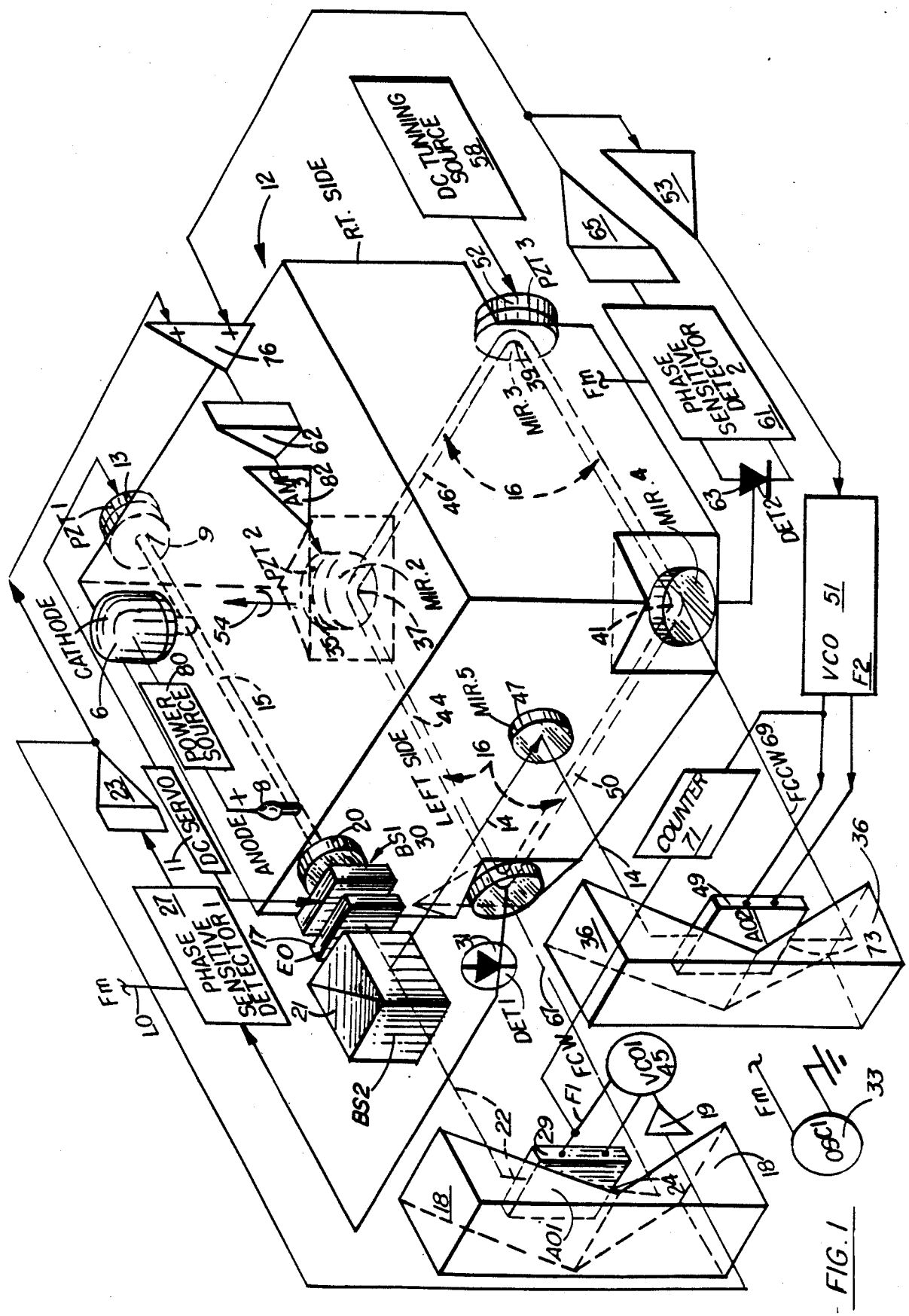
FIG. 1 is a prospective view of the phase locked passive ring resonator gyroscope.
Figure 2:
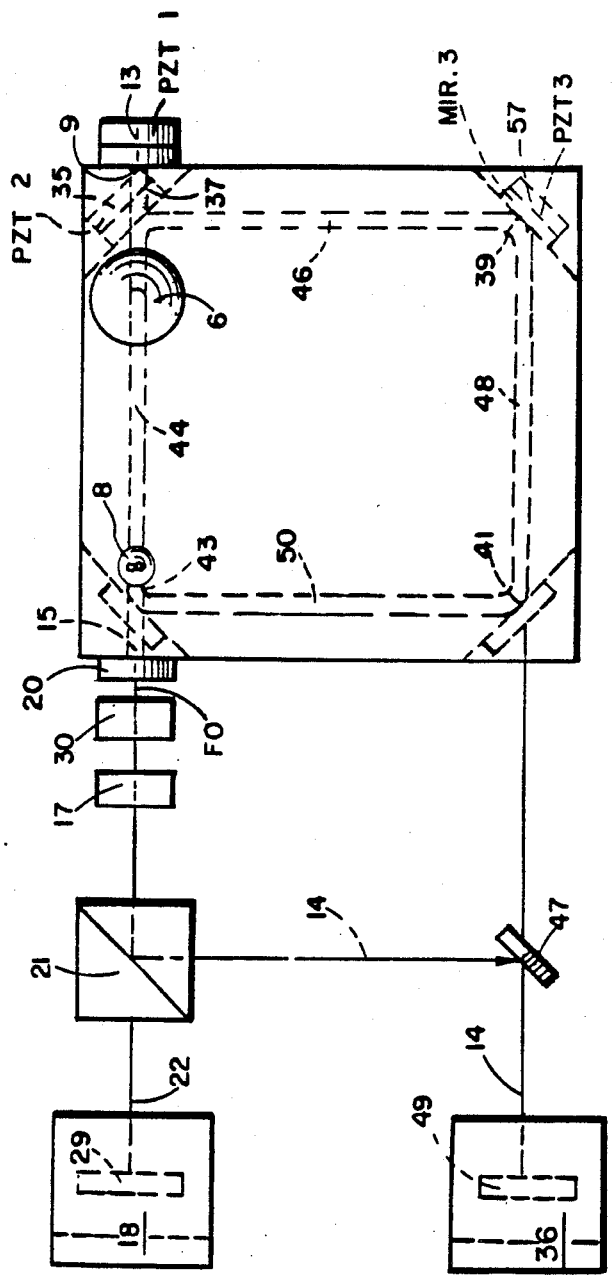
FIG. 2 is a top planar view of the two source passive ring resonator gyroscope 10 of FIG. 1 showing the first and second resonator cavities in phantom. Left and right partially transmissive mirrors 43, 41 represent first and second partially transmissive and receiving ports.

Referring now to FIG. 1, an embodiment of the invention identical servo frequency modulated passive ring resonator gyroscope 10 is depicted having a single piece body 12 having integral first, and second resonator cavities 15, 16. The term "integral" is meant to convey the idea that the body 12 is formed from one homogenous piece of material such as ZERODUR. The top layer has a first cavity that serves as a linear laser. The output of the linear laser is not influenced by inertial rate inputs to the gyroscope.

The first laser means (cavity 15) is shown sourcing single frequency light at frequency Fo through the first resonator partially transmissive mirror 20 to BS1 (beam splitter 1) 30, and then to EO (electro-optic modulator) 17. The beam is frequency modulated +/− Fm by EO 17 and passes to beamsplitter 21 to form first and second frequency modulated rays 22, 14, respectively.

A first oscillator, OSC1, 33 provides a sinusoidal reference signal at a frequency Fm (typically 10 MHz) to EO 17 and as a reference signal to PSD1 27 and PSD2 61 (Phase Sensitive Detector).

The EO device is typically a phase modulator device obtained from a company such as LASERMETRICS, Electro-Optics Div. at 196 Coolidge Ave., Englewood, NJ 07631, or one such as Model 10-P-22-3-2-2.5 obtained from QUANTUM TECHNOLOGY, INC. of 2620 Iroquois Ave., Sanford, Florida 32771.

The EO 17 frequency modulates light from laser 15 at frequency Fo from a lower frequency of (Fo−Fm) to a high end frequency of (Fo+Fm) where Fo is the laser center frequency and where Fm is the frequency of the reference signal from OSC1 33.

Beamsteering optics, such as first prism 18 couples the first frequency modulated ray as beam 22 through AO1 (acousto-optic modulator) 29. AO1 is a frequency shifter driven by VCO1, 45, a voltage controlled sinusoidal oscillator typically operating at a second reference frequency in the range of from 40 MHz to 80 MHz. The AO1 device is structured to upshift the frequency of the first frequency modulated ray 22 to a frequency F1 higher than that of the first frequency modulated ray 22.

Figure 7:
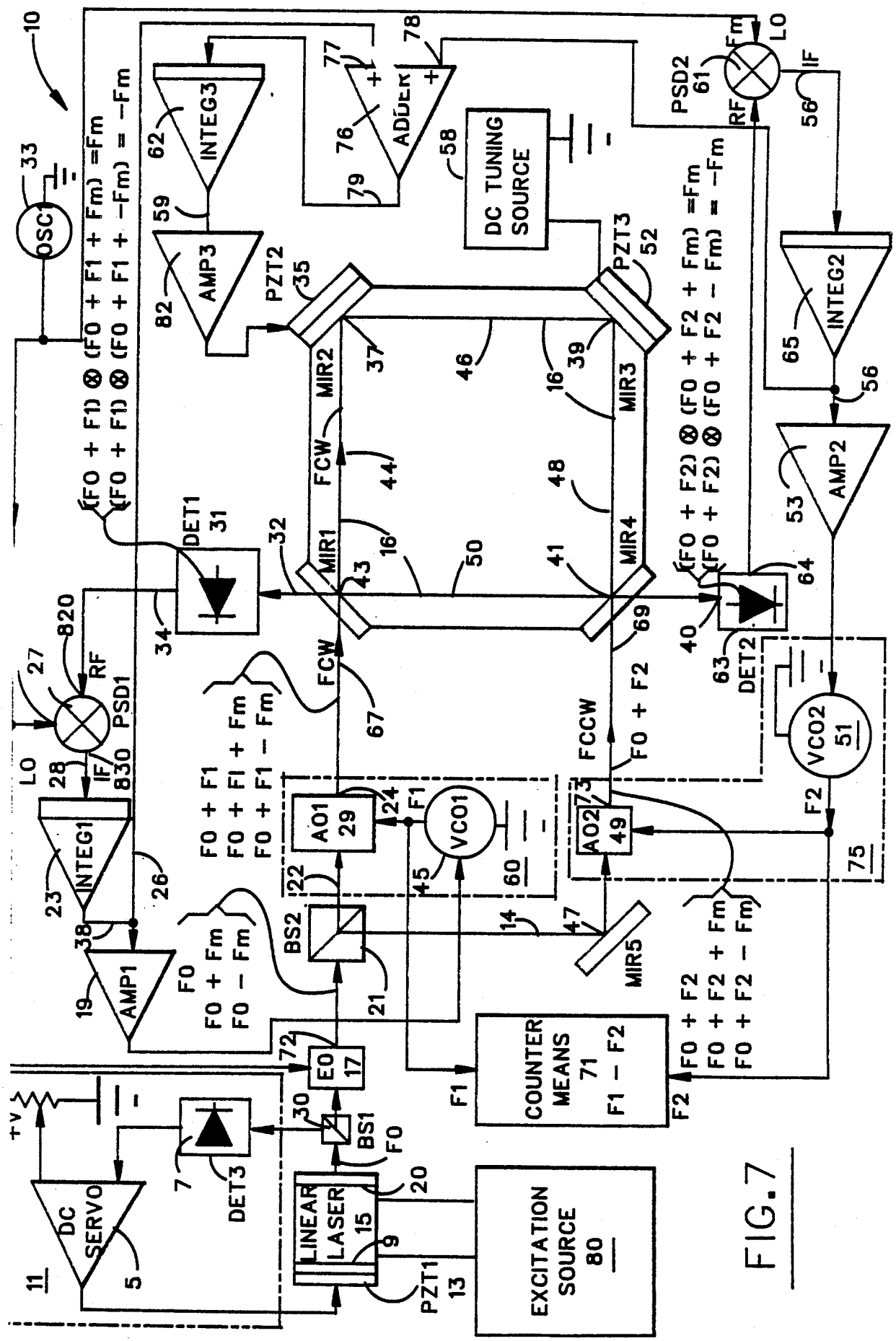
FIG. 7 is a combination schematic and block diagram of the associated electronics and optical elements of the phase locked passive ring resonator gyroscope using three servo control loops.

Acousto-optic device AO1 29 and VCO1 45 in combination as shown by phantom block 60 in FIG. 7 represent a means for frequency shifting the first frequency modulated ray in response to a first control signal, such as the signal from the output of AMP1, 19.

Referring again to FIG. 1 and to FIG. 7, BS2 21 splits the frequency modulated light source into first and second frequency modulated rays 22, 14 respectively. The first frequency modulated ray 22 passes to AO1, 29. AO1 aperture 24 acts as a propagating beam source for clockwise propagating beam 67 FCW. Beam 22 is upshifted in frequency by F1 by AO1, 29.

The second frequency modulated ray 14 is first reflected by MIR5, 47 to AO2, 49. Ray 14 is upshifted in frequency F2 by AO2. Aperture 73 of AO2 serves as a counterpropagating light beam source FCCW for counterpropagating light beam 69. Counterpropagating light beam 69 is a counterclockwise ray, FCCW as it passes through MIR4, a partially transmissive mirror 41.

Acousto-optic device AO2 49 and VCO2 51 in combination as shown by phantom block 75 in FIG. 7 represent a means responsive to a second frequency modulated ray for frequency shifting the second frequency modulated ray in response to a second control signal, such as the signal from the output of AMP2, 53.

Figure 3:
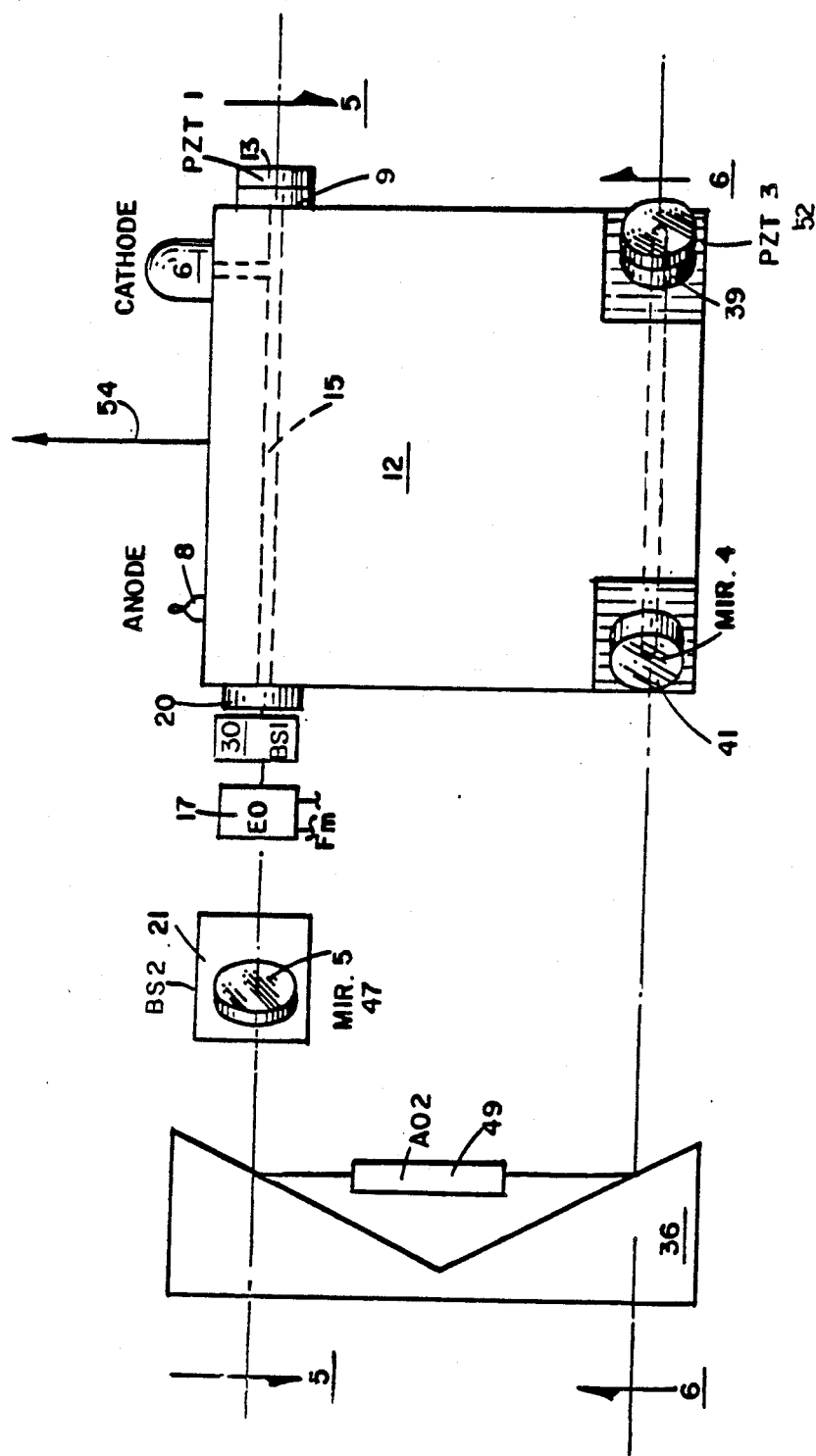
FIG. 3 is a front view of the phase locked passive ring resonator gyroscope body.
Figure 4:
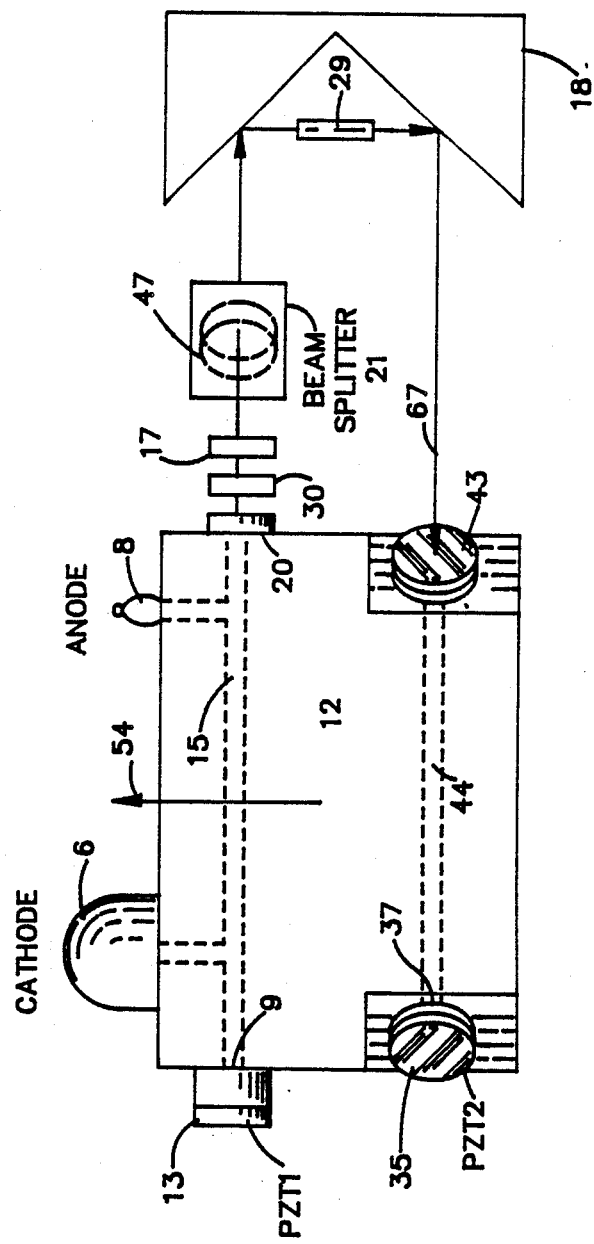
FIG. 4 is a rear view of the phase locked passive ring resonator gyroscope body.

The second resonator cavity 16 is a passive high Q evacuated cavity having a closed optical path with first, second, third, and fourth segments, 44, 46, 48, 50 tuned in combination to resonate at a frequency derived from the first resonator cavity. The sensitive axis, characterized by Vector 54, as shown in FIG. 3 and FIG. 4, is essentially normal to the plane of the closed second optical path established by the plane of segments 44, 46, 48, 50.

Part of the FCW beam is reflected off the cavity 16 at MIR143 and is focused on output detector 31 at DET1 receiving aperture 32. Detector DET1 31 and DET2 63 are typically silicon photodiodes, such as model FND-100 by EG&G Corp. of Wakefield, Massachusetts.

First detector 31 samples the FCW beam and provides a first offset frequency error signal on signal line 34 to the RF input of PSD1 27. PSD1 provides a positive or negative first phase error signal on signal line 28 to INTEG1 23 for integration. INTEG1 23 provides a first phase control signal on signal line 38 to the inputs of AMP1 19 and via signal line 26 to ADDER 76. AMP1 conditions the first phase control signal and provides a first control signal to VCO1 45 to shift the frequency of the first frequency modulated ray by a first variable offset frequency (F1) to form the propagating light beam (FCW) within the passive cavity 44, 46, 48, 50. The first control signal's amplitude and polarity are controlled by INTEG1 and AMP1 to shift the frequency of F1 in a direction to drive the first phase error signal on signal line 28 to zero volts.

Second detector 63 samples the FCCW beam and provides a second offset frequency error signal on signal line 64 to the RF input of PSD2 61. PSD2 provides a positive or negative second phase error signal on signal line 56 to INTEG2 65 for integration. INTEG2 65 provides a second phase control signal on signal line 59 to the inputs of AMP2 53 and via signal line 78 to ADDER 76. AMP2 53 conditions the second phase control signal and provides a second control signal to VCO2 51 to shift the frequency of the second frequency modulated ray 14 by a second variable offset frequency (F2) to form the counterpropagating light beam (FCCW) within the passive cavity 44, 46, 48, 50. The second control signal's amplitude and polarity are controlled by INTEG2 and AMP2 to shift the frequency of F2 in a direction to drive the second phase error signal on signal line 56 to zero volts.

Figure 9:
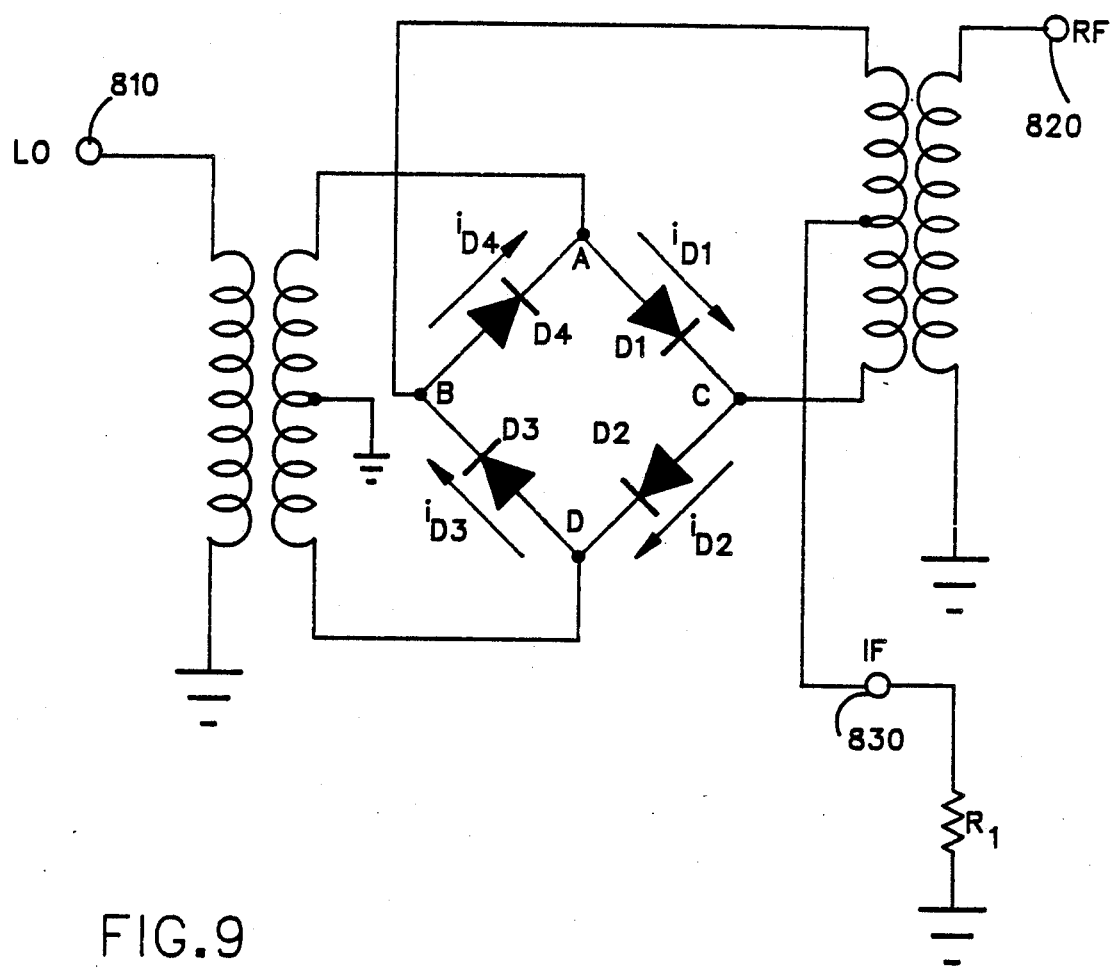
FIG. 9 is a schematic of a mixer used as a phase sensitive detector.

FIG. 9 is a schematic of a mixer used as a PSD (phase sensitive detector) such as PSD1 27 and PSD2 61. FIG. 9 shows the structure of a PSD to be a passive device. The circuit of FIG. 9 is a type referred to as a double balanced mixer. The PSD1 and PSD2 mixers 27, 61 of FIG. 7, respectively, operate as phase-sensitive detectors in applications where the frequency of signal applied to the LO terminal 810 is the same as the frequency of the signal applied to the RF terminal 820. The PSD1 and PSD2 mixers 27, 61 are typically commercial components such as the ZAD-6 from the MINI-CIRCUITS COMPANY at P.O. Box 166, Brooklyn, New York 11235. A further discussion of the operation of balanced mixers is found in an article entitled "Mixers As Phase Detectors", RF SIGNAL PROCESSING COMPONENTS, by the Watkins-Johnson Company, 1983/84, p. 605-631.

Figure 8:
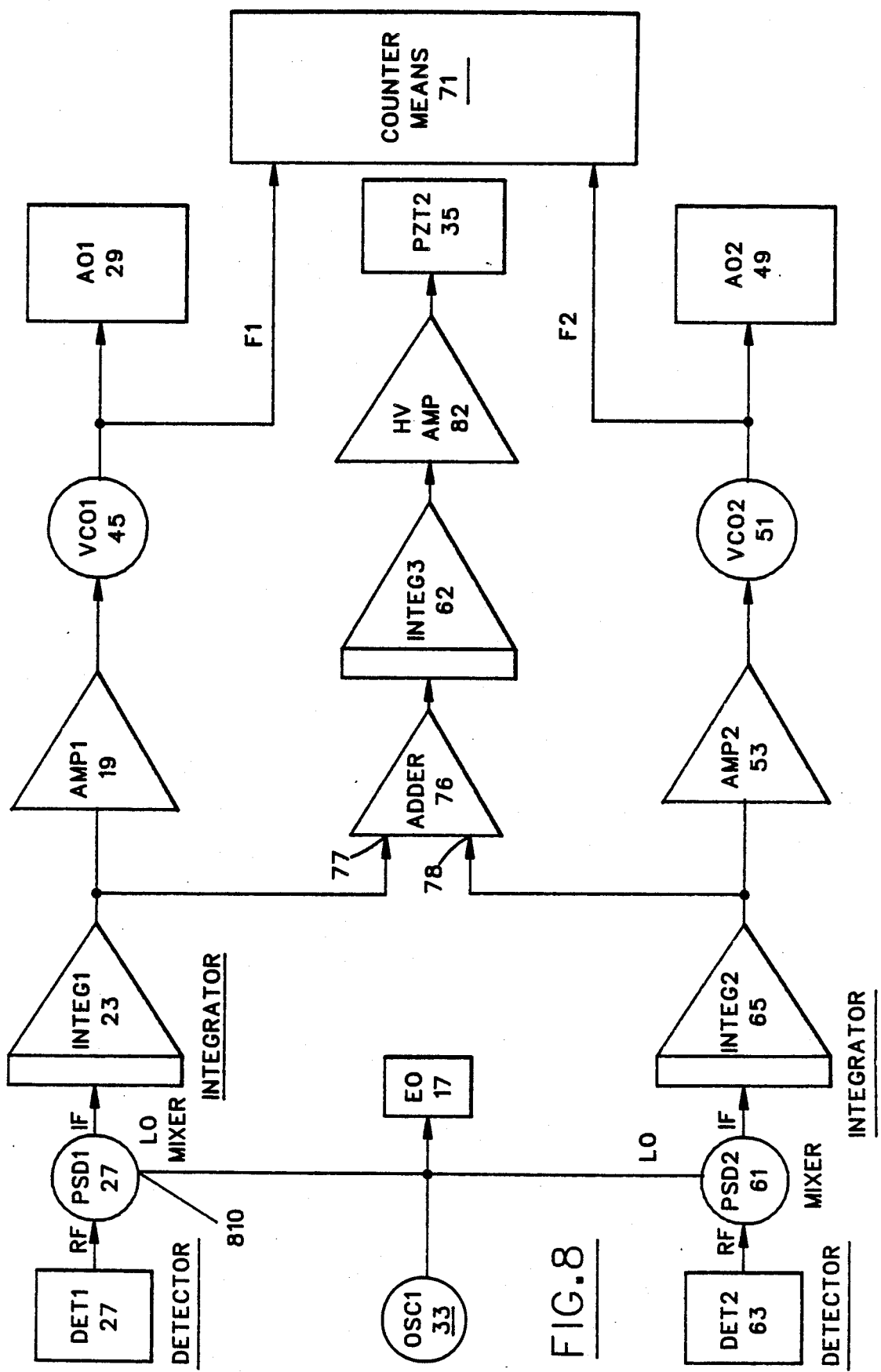
FIG. 8 is a schematic of the control electronics for the invention.

Referring to FIGS. 8 and 9, the LO (local oscillator) terminal 810 is driven by a reference signal such as Fm from OSC1, 33 as shown in FIG. 7. The RF (radio frequency) terminal 820 typically receives a signal for detection such as the output signals from DET1 (detector 1) 31 on signal path 34 or from DET2 63 via signal output 64. The output signal from a phase sensitive detector is fed from the IF terminal 830 to load R1. The signal at IF terminal 830 is filtered and typically has a zero volt value where the frequency of the signal at the LO terminal 810 is the same as the frequency of the signal at the RF terminal 820 and where the phase difference is zero degrees. With a fixed frequency signal, such as Fm, present at terminal 810 and with a fixed frequency input signal of the same frequency present at the RF input terminal 820 the IF port will output a DC signal related to the phase of the LO and RF signals. A DC output signal develops at terminal 830 of one polarity for an input RF signal having a phase relationship of a first sense, i.e. leading with respect to that of the LO signal. An opposite polarity signal will result at the IF terminal 830 for an input RF signal having a second sense, i.e. lagging with respect to that of the LO signal.

Figure 11A:
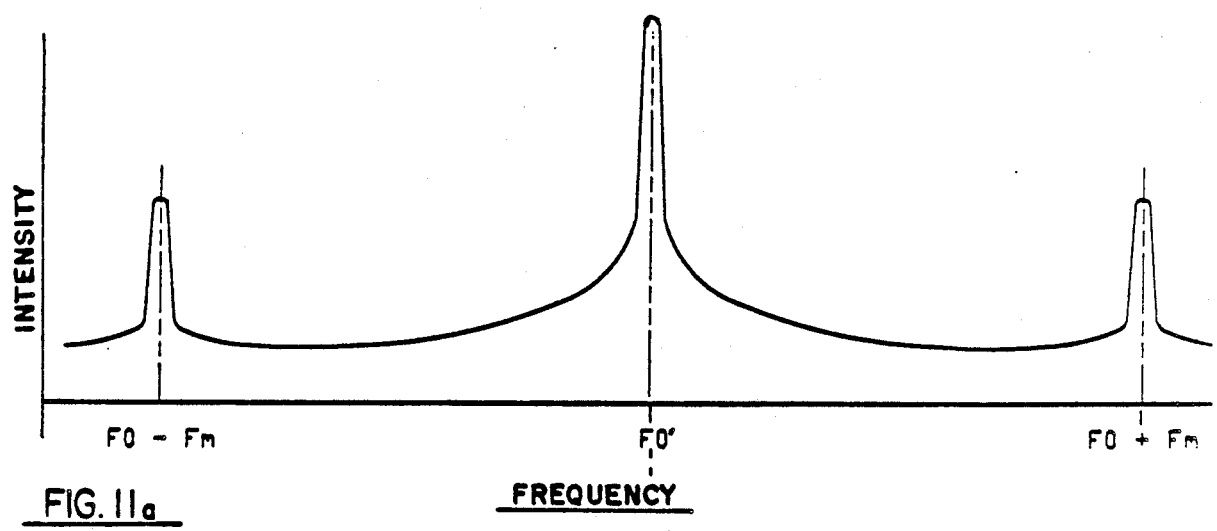
FIG. 11a shows a wave form that represents the spectral amplitude characteristic or intensity of a laser source that is frequency-modulated over a range of from (Fo−Fm) to (Fo+Fm), where Fo is the laser center frequency.
Figure 11A:
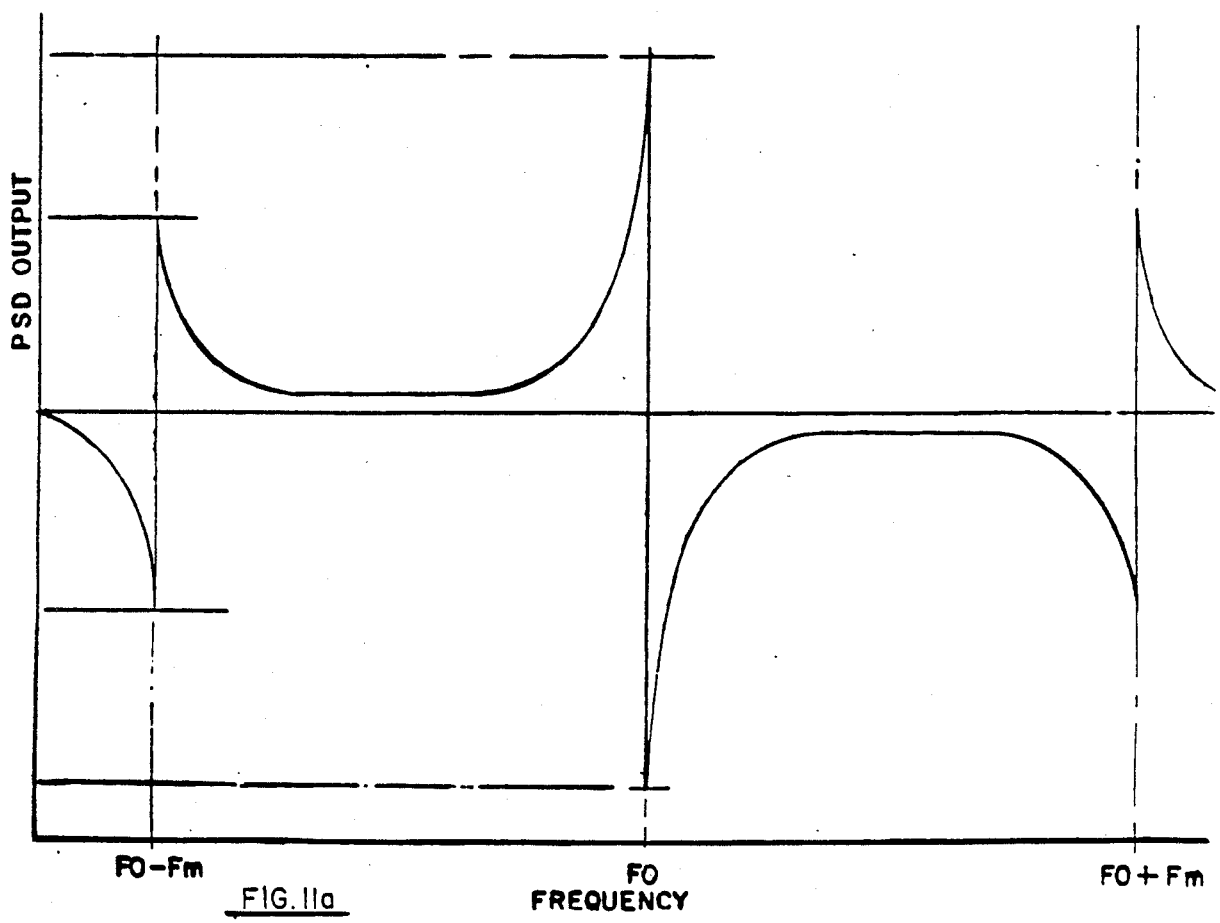
Figure 12:
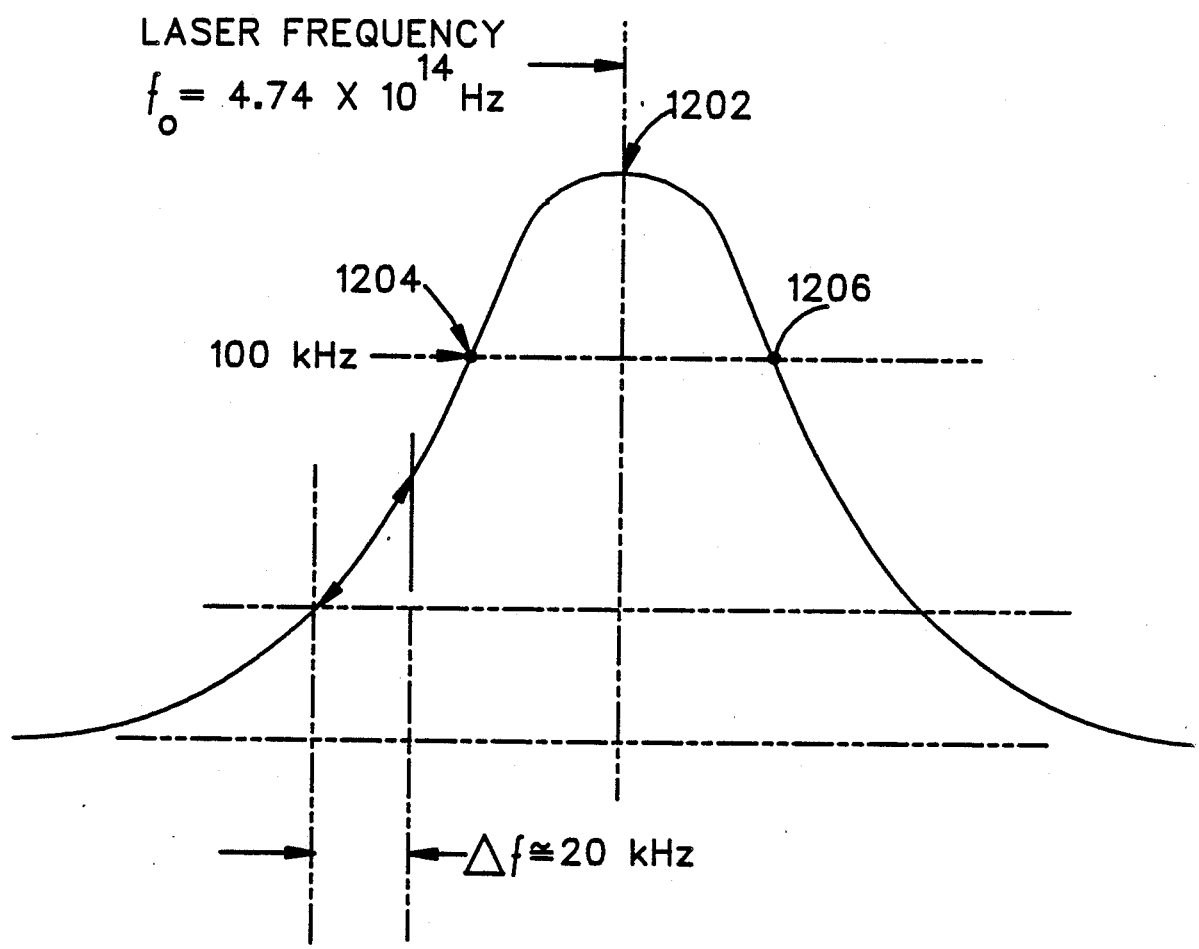
FIG. 12 shows a waveform depicting the response characteristic and center frequency of a passive resonator and depicting the center frequency of a HeNe laser.

The waveform in FIG. 11a represents the spectral content of light rays 32 and 40 incident on DET1 31 and DET2 63 with the detectors being located as shown in FIG. 7. The upper waveform of FIG. 11a is obtainable by monitoring the input beams 67 and 69 with a spectrum analyzer. The waveform of FIG. 11b depicts the signal response of PSD1 and PSD2 at their respective IF terminals 830 in FIG. 8 or such as 28, 56 in FIG. 7, as the center frequency of the laser is gradually tuned over a frequency range extending from below (Fo−Fm) to a high frequency of (Fo+Fm) and while leaving the spectral feature, in this case, the resonator cavity 16 having a fixed center frequency at Fo. FIG. 11b is intended to illustrate the response characteristic of the cavity and phase-sensitive detectors. In operation, the laser is fixed in frequency at FO and the servo forces the system to operate at point 1002 as shown in FIG. 12 by constantly adjusting F1 and F2.

Elements such as PSD1, INTEG1, AMP1, and PSD2, INTEG2 AMP2 represent in combination two identical a cavity servo means responsive to the reference signal Fm and to the first and second offset frequency error signals from the detectors for providing a first control signal to the first voltage controlled oscillator VCO1 for frequency shifting the first frequency modulated ray by a first variable offset frequency (F1) to maintain the propagating light beam (FCW) in the second resonator at peak resonance by driving the phase difference between the detected first offset frequency error signal and the fixed reference signal to a minimum value and to provide a second control signal to the second voltage controlled oscillator means for frequency shifting the second frequency modulated ray by a second variable offset frequency (F2) to control and maintain the counterpropagating light beam (FCCW) at peak resonance by driving the phase difference between the detected second phase error signal and the fixed frequency reference signal to a minimum value.

Output counter means 71 is provided for measuring and outputting the frequency difference between the first variable offset frequency and the second variable offset frequency. The measured frequency difference represents the difference in frequency due to an input gyro body rate about the sensitive axis 54. Output counter means 71 is typically a counter such as a HP3335 by Hewlett Packard for use in a laboratory, but in alternative product designs, the counter would be fabricated from conventional high speed logic circuit elements such as MECL or ECL logic by MOTOROLA suitable for use at frequencies at and above F1, the frequency of the reference signal generator (to the AO).

Referring to FIG. 7, the laser means within phantom block 11 has a means for sampling and detecting said single frequency light source such as DET3. The laser means also has a piezoelectric transducer (PZT1) 13 having a mirror surface 9 positioned within the integral laser cavity to adjust the pathlength of reflected light within the laser cavity. The PZT1 is responsive to the laser control signal from DC SERVO 5 to peak adjust the output intensity of the single frequency light leaving said first resonator cavity at frequency Fo.

BS1 30 represents a means for sampling the single frequency light source. BS1 has a receiving aperture responsive to the single frequency light (Fo) from said first resonator laser means transmitting mirror 20. BS1 also has an aperture for providing a small sample of the single frequency light source (Fo) to a detector means such as DET3, 7. DET3 is a conventional detector such as that described in connection with DET1 and DET2.

Referring to FIG. 7, the elements within phantom block 60 represent a first voltage controlled oscillator means. These elements comprise a first voltage controlled oscillator (VCO1) 45 for providing a first variable offset frequency signal (F1) and a first acousto-optic modulator (AO1) 29 responsive to the first frequency modulated ray 22 and to the first control signal for upshifting the frequency of the first frequency modulated 22 ray by a frequency equal to the frequency of said first voltage controlled oscillator output signal F1 and for providing the propagating light source (FCW) from aperture 24 as ray 67.

The elements within phantom block 75 represent a second voltage controlled oscillator means. These elements comprise a second voltage controlled oscillator (VCO2) 51 for providing a second variable offset frequency (F2); and a second acousto-optic modulator (AO2) 49 responsive to the second frequency modulated ray and to the second control signal for upshifting the frequency of the second frequency modulated ray 14 by a frequency equal to the frequency of the second voltage controlled oscillator output signal F2 and for providing the propagating light source (FCCW) from aperture 73 as ray 69.

The respective DC AMPLIFIERS (19, 53) are driven by the outputs of respective integrators to apply first and second control signals to the VCO's (45, 51) which shift the input CW and CCW beams in a direction to increase the response of the signal from the passive resonator cavity. As the signal from the DC AMP (19, 53) reaches a value sufficient to peak the tuning of the resonator, the signal out of the mixer goes to zero and the output of the integrator stops changing. Therefore this passive ring laser design has two identical servo loops controlling the CW and CCW beams and resonances. The error signals (26, 59) from the integrators are summed and then integrated to provide the path length control signal for the passive resonator.

The first partially transmissive and receiving port 43 is characterized to receive and pass the first frequency modulated light ray 67 into the passive resonator cavity 16 to form the propagating light beam (FCW).

The second partially transmissive and receiving optical port 41 is characterized to receive and pass the frequency offset beam 69 into the second resonator 16 cavity to form a counterpropagating light beam (FCCW).

PZT2 and PZT3 35, 52 shown in FIG. 7 represent piezoelectric transducers. PZT2 and PZT3 each function as an electromechanical transducer, attached to reflective surfaces 37, 39 so as to modulate the second resonator's optical path length to maintain the propagating light FCW and counterpropagating light FCCW at peak resonance within cavity 16. PZT2 represents a dynamic path length adjusting means for adjusting the optical path length of the passive resonator cavity.

The combination of ADDER 76, in cooperation with INTEG3 62, AMP3 82, and PZT2 35 represents a means responsive to the first and second control signals in summing input terminals 77 and 78 for providing said passive cavity path length servo signal to the passive cavity path length adjusting means such as PZT2 and for constantly adjusting the passive cavity path length servo signal to keep the passive cavity at peak resonance at a frequency substantially mid-range between the propagating and the counterpropagating beams. This method of path length control extends the oscillation range of both VCOs and keeps the CW and CCW cavity resonance centered about the frequency the cavity is resonant at when the cavity is not rotating.

The combination also has an integrator such as INTEG3 62 having an input and output terminal 54. The integrator input terminal is coupled to the ADDER output terminal via signal line 79. The integrator output terminal is coupled via AMP3 82 to provide the passive cavity path length servo signal to the passive cavity path length adjusting means such as PZT2 35.

PZT3 52 is a static optical path length adjusting means that provides an initial coarse adjustment for the cavity 16. PZT3, 52 is adjusted by manually adjusting the output voltage of DC TUNING SOURCE 58 to center tune the system when the inertial rates into the gyro are zero.

Figure 10A:
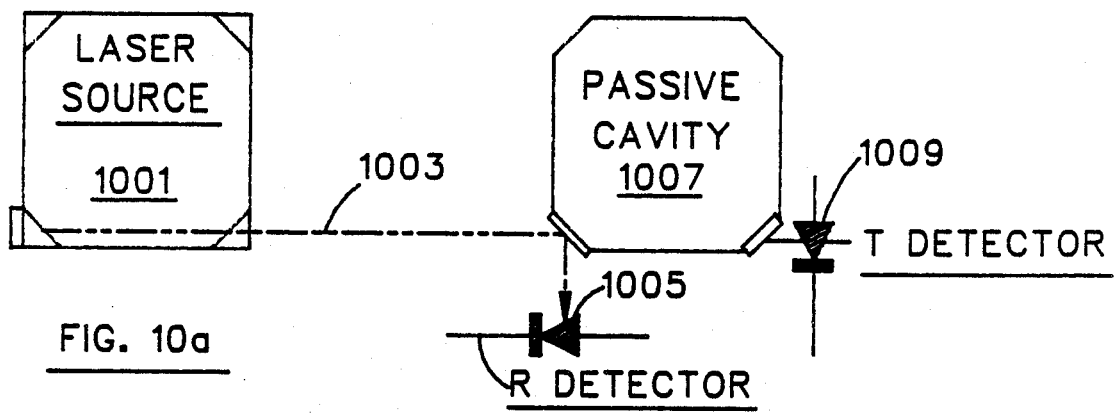
FIG. 10a shows the relative position of two detector diodes in relation to a laser source on the left and a passive cavity on the right.
Figure 10B:
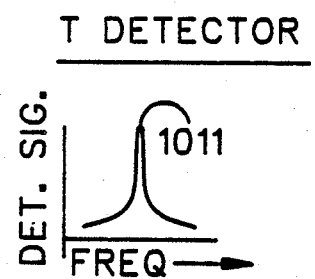
FIG. 10b shows the response characteristic of the rightmost detector.
Figure 10C:
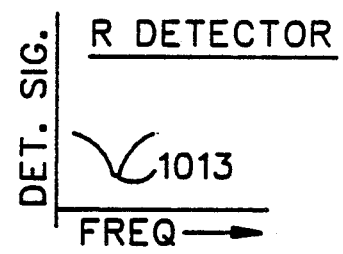
FIG. 10c shows the response characteristic of the lower detector.

Mirrors 43 and 41 have reflective surfaces positioned to direct the reflected incident beams FCW and FCCW to their respective detectors 31 and 63. The intensity of the light striking detector 31 or 63 has a high background level that dips as the resonant cavity 16 achieves resonance in response to a shift in frequency of the respective laser source. FIG. 10a characterizes a laser source directing a beam at a representative port with a portion of the beam being reflected to a detector such as detector 63. FIG. 10b depicts a peak response to incident light from detector 1009. FIG. 10c shows a dip in the background of the light intensity 1013 striking the detector such as 1005 as the laser source at 1001 is tuned to the resonance point of the passive cavity 1007.

The first and second detectors 31 and 63 of FIG. 7 are positioned to receive reflected light as detector 1005 goes from laser 1001 in FIG. 10a. FIG. 10c shows a response curve having a dip at resonance 1013. This response characteristic corresponds to that for diode 1005 receiving the reflected input beam. The response curves for detectors 31 and 63 dips at resonance because, in the embodiment depicted by FIG. 1 and FIG. 7, these diodes receive reflected light from mirrored surfaces 43 and 41, respectively. At resonance, second cavity 16 absorbs light entering through mirror surfaces 43 and 41, thereby leaving less light for reflection from the respective mirrored surface. Detector 1009 of FIG. 10b is positioned to receive light from resonator 1007 in accordance with the response characteristic 1011 of FIG. 10b. The relative position of detector 1009 to measure the transmitted light is not used in the embodiment of FIG. 7.

FIG. 12 depicts the pass band of a typical passive cavity having a resonance peak at 1002. The approximate frequency spread between reference 1004 and 1006 represents a typical frequency range between the half-power points and is included in FIG. 12 along with the indicated laser center frequency, to provide the reader with a visual appreciation of the "Q" of the second resonator. The phrase "frequency stabilization" is understood to mean phase sensitive detecting and is also meant to include the principle of servo locking the laser output to the intensity peak of the passive cavity.

A HeNe laser typically has an instantaneous line width of less than one Hz but the operating frequency is subject to considerable jitter.

The dip represented by FIG. 10c would also typically have half-power points separated by 40 kHz. Referring to FIG. 10a, typically, a HeNe input laser would have its output at $4.74 \times 10^{14}$ Hz injected along path 1003 into the passive cavity 1007.

Figure 6:
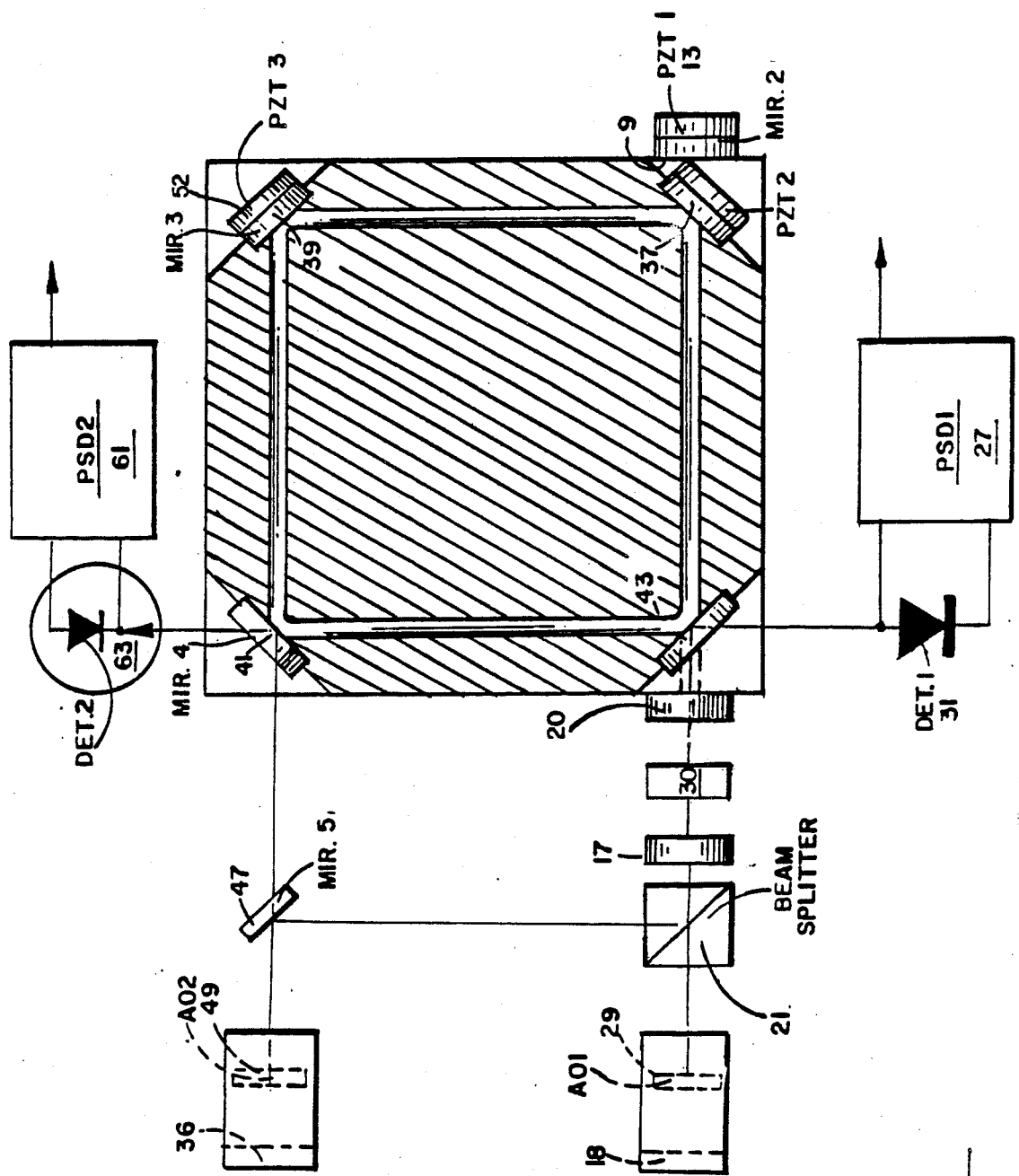
FIG. 6 is a cross sectional view of the phase locked passive ring resonator gyroscope body taken along sectional line 6—6 of FIG. 3 and viewed from the bottom.

FIG. 6 shows the second resonator cavity in section as viewed from the bottom surface to the top of the gyro. The second cavity 16 has first, second, third and fourth evacuated hollow segments, 44, 46, 48, 50. In the case of a triangular cavity (not shown) only three segments would be used. The segments of cavity 16 are coupled at their ends to form a closed planar evacuated path. For example, one end of segment 44 is joined with one end of segment 46 at an intersection where mirror surface 37 is attached to PZT2 35.

In another alternative embodiment of the IDENTICAL SERVO FREQUENCY MODULATED PASSIVE RING LASER GYRO 10, the laser resonator cavity 15 is positioned and dimensioned in relation to the passive resonator cavity 16 to provide partial dimensional change compensation for optical path length changes in response to induced body dimension changes by temperature or external force. Bias errors relating to temperature induced body dimension changes or to changes from external forces applied to said body are cancelled providing a passive ring resonator gyroscope having enhanced stability.

Figure 5:
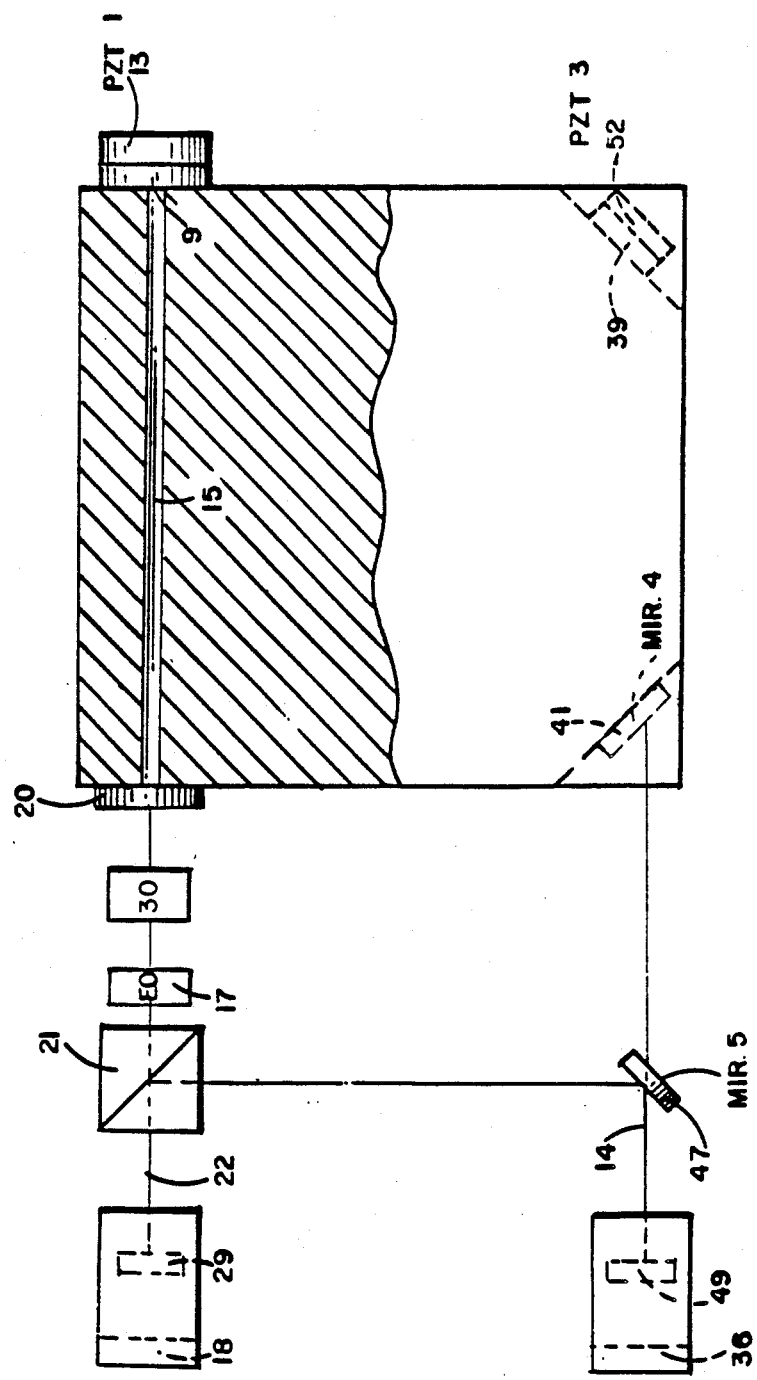
FIG. 5 is a cross sectional view of the phase locked passive ring resonator gyroscope body taken along line 5—5 of FIG. 3.

FIG. 5 shows the first resonator cavity 15 in section. The laser resonator cavity has a transmitting optical port means at first cavity port 20 for transmitting stabilized single frequency light Fo and at least two internal body-mounted reflective surfaces such as partially transmissive mirror 20 and mirror surface 9 on piezoelectric transducer PZT1, 13.

An appropriate gain medium, such as a mixture of Helium and Neon, is contained in the first resonator cavity 15 at a pressure in the range of 4 to 10 torr when sealed.

Referring to FIG. 7, block 80 titled EXCITATION SOURCE represents a means for exciting the gain medium within said first cavity 15 to induce lasing. This element is also shown in the embodiment of FIG. 1. This element is typically a controllable current source capable of an output voltages determined by the ionization potential of the gas mixture and an output current in the range of one to ten milliamperes.

The first and second resonator cavities induce output signal frequency bias error in response to small body dimension changes, such as those induced by temperature changes. The passive resonator passive cavity 16 is positioned, i.e. is in parallel alignment, and is dimensioned in relation to the laser resonator cavity to experience relatively equivalent optical path length changes in response to induced body dimension changes.

Although FIGS. 1 and 7 each depict use of straight cavities for the laser means, the use of an L-shaped laser as the laser resonator cavity above, below or in the same plane as the passive resonator are anticipated to be alternative embodiments that can offer the promise for dimensional compensation. Additional alternative embodiments include an arrangement in which the first laser means has segments orientated to be transverse or orthogonal to the plane of the passive resonator cavity 16.

Optical detector units (such as detector DET3 7) typically contain a reversed biased PIN diode and a low noise preamplifier. A detector such as the SD-00-12-12-231 manufactured by the Silicon Detector Corp. of Newbury Park, CA. is suitable for use with a Helium Neon laser light source.

OPERATION

Due to the Sagnac effect, the path lengths of the clockwise (FCW) and counterclockwise (FCCW) beams in ring resonator differ as a function of body rotation rates. Consequently, the resonant frequencies for CW and CCW light in the passive cavity have a corresponding difference dependence. The goal of the optics and electronics of the IDENTICAL SERVO FREQUENCY MODULATED PASSIVE RING LASER GYROSCOPE (PRRG) is to detect the frequency difference that arises between the CW and CCW beams due to inertial rotations. The intent of the single body small source linear phase locked laser/passive cavity design is to eliminate bias errors caused by the resonant frequencies of the linear laser and passive cavity changing with respect to one another. In this integral, single block, or single piece body these bias errors will also be independent of input rotation rates. The two cavities are arranged mechanically and geometrically to insure that shifts in laser frequency arising from body dimensional changes are experienced by both the passive resonator cavity and the linear laser cavity and therefore reduce the effect of such bias errors.

To obtain such bias compensation, the Free Spectral Range of the first resonant cavity 15 is made equal to the Free Spectral Range of the second resonant cavity 16. The Free Spectral Range (F.S.R.) $=c/p$ where c is the speed of light and p is the optical round trip pathlength of a resonator. Thus, the F.S.R. of a square passive ring resonator with sides of length L is $c/4L$. To meet the F.S.R. requirement, two cases arise contingent upon the linear resonator design. The first resonator forming the laser means is comprised of a mirror with no curvature, i.e. a flat mirror, and a mirror with a predetermined radius of curvature, i.e. a curved mirror, the required resonator length between mirrors is L. The F.S.R. of this flat mirror, curved mirror resonator equals $c/4L$. However, a resonator using two curved mirrors requires a resonator length between mirrors equal to 2L. This configuration also has a F.S.R. equaling $c/4L$. With the criteria that:

$$(F.S.R.)_{Laser}=(F.S.R.)_{Passive\ Resonator}=c/4L.$$

it is apparent that any change in the F.S.R. of the laser resonator will equal any change in the F.S.R. of the passive ring resonator which may arise from thermal or mechanical changes.

Mirrors with piezoelectric (PZT) backings supply a path length adjusting means to the passive resonator cavity. This adjustment effects both the paths of the CW and CCW beams.

Light reflected off the passive cavity from the CW direction is detected and phase sensitive demodulated by employing a mixer or phase sensitive detector (PSD). The phase error signal is integrated, amplified and then applied as shown in FIG. 8 to the input of VCO1 to bring the CW beam to resonance. Light reflected off the passive cavity from the CCW direction is detected and phase sensitive demodulated by the PSD. The second phase error signal is integrated, amplified and then applied to the input of VCO2 to bring the CCW beam into resonance. Therefore, the respective VCOs shift the respective frequencies of the injected CW and CCW beams to bring them into resonance in the passive cavity; identical servo loops are used for both CCW and CW beams. In the preferred embodiment, a DC tuning source signal from DC TUNING SOURCE 58 is applied to PZT3 to provide for initial coarse frequency alignment. The sum of the first and second phase error signals is used as a passive cavity path length servo control signal to compensate for the thermal and mechanical drifts in the cavity and also to keep the passive cavity at peak resonance midway between the CW and CCW resonances.

Acousto-Optics

The two AO devices are each typically made up of a piezoelectric transducer attached to a crystal. The AO device is fabricated from a piezoelectric crystal material such as quartz, $TeO_2$ (Telurium Dioxide) or $PbMoO_4$ (Lead Molybdate). In the preferred embodiment, the AO1 transducer driven at F1, establishes an acoustic wave at frequency F1 in the crystal. Associated with the acoustic wave is a varying index of refraction due to the compressions and rarefactions of atomic density in the crystal. Incoming light diffracts off this induced grating giving rise to many orders of diffracted beams. The zeroth order beam is at the frequency of the single frequency light, Fo +/−Fm. The first order beam has the frequency (Fo +/−Fm)+F1 where F1 is the frequency of the acoustic wave. Here the input beam is assumed to be Fo +/−Fm.

The output from the AO device has the discrete frequencies (Fo +/−Fm)+nF2 where n=0,1,2 . . . each separated in space by an angle proportioned to n. Thus, we see that by shifting the AO F2 wave frequency by 1 Hz, we can add 1 Hz to the frequency of the first order beam exiting the AO2 device. Therefore, the AO's operate as frequency shifters in our application. (See e.g., *Optical Waves in Crystals*, A. Yariv and P. Yeh (John Wiley and Sons)

Operation

The Phased Locked ring laser gyroscope shown in FIG. 1 has two identical servo control loops, each being referenced to OSC1 (oscillator 1) 33. Each servo loop uses light originating from linear laser 15 and modulated by EO (electro-optic modulator) 17.

Laser 15 provides a relatively coherent light source at frequency Fo to EO (electro-optic modulator) 17. EO 17 driven by OSC1, 33 at Fm. Therefore, EO 17 frequency modulates the Fo source at frequency Fm (typically 10 MHz). For small modulation amplitudes, the light source from EO 17, ray 72, has side bands at Fo+Fm and at Fo−Fm. The modulated laser light source is split by beamsplitter 21 to source a first beam, ray 22, to AO1 (acousto-optic modulator 1) 29 and a second beam, ray 14, to MIR5 (mirror 5) and thence to AO2, 49 (acousto-optic modulator 2).

VCO1 45 typically operates at a frequency of 40 MHz and drives AO1 29 at frequency F1. The light source having frequency components Fo, FO+Fm and Fo−Fm passes through AO1 29 and is frequency shifted to contain frequency components Fo+F1+Fm, Fo+F1−Fm and Fo+F1.

The light source from AO1, is directed to and predominately reflects off a partially transmissive reflector 43. That portion of the light that enters passive cavity 16 circulates as ray 44, ray 46, ray 48 and ray 50 to form the FCW (clockwise) beam in the cavity.

Referring to FIG. 7, the input path to the first servo loop consists of the path through BS2 21, to AO1 29, to MIR1 43, to reflected ray 32, and to DET1 31. DET1 31 provides an electrical signal via signal line 34 to the RF input of PSD1 (phase sensitive detector 1) 27. PSD1 27 also receives a signal at frequency Fm at its LO input. PSD1 provides a phase related error signal at its IF output to INTEG1 (integrator 1 ) 23.

Each error signal is produced as the instantaneous frequency of the laser is swept past the line bandwidth of the cavity. At that moment, the cavity absorbs the FCW light on MIR1 to produce a dip in the signal to the DET1 31 and subsequently to PSD1 27. PSD1 is a phase sensitive detector referenced to the OSC1 source 33 at frequency Fm and is sensitive only to the Fm signal component within ray 32 to DET1.

VCO2 51 typically operates at a variable offset frequency and drives AO2 49 at frequency F2. The light source having frequency components Fo, Fo+Fm and Fo−Fm passes through AO2 49 and is frequency shifted to contain frequency components Fo+F2+Fm, Fo+F2−Fm and Fo+F2.

The light source from AO2 is directed to and predominately reflects off of partially transmissive reflector 41. That portion of the CCW ray that enters passive cavity 16 circulates as ray 48, ray 46, ray 44 and ray 50 to form the FCCW (counterclockwise) beam in the cavity.

Referring to FIG. 7, the input path to the second servo loop consists of the path through BS2 21, to AO2 49, to MIR4 41, to ray 40, and to DET2 63. DET2 63 provides an electrical signal via signal line 64 to the RF input of PSD2 (phase sensitive detector 2) 61. PSD2 61 also receives a signal at frequency Fm at its LO input. PSD2 provides a phase related error signal at its IF output to INTEG2 (integrator 2) 65.

Each error signal is produced as the instantaneous frequency of the laser is swept past the line bandwidth of the cavity. At that moment, the cavity absorbs the FCCW light on MIR4 to produce a dip in the signal to the DET2 63 and subsequently to PSD2 61. PSD2 is a phase sensitive detector referenced to the OSC1 source at frequency Fm and is sensitive only to the Fm signal component within ray 40 to DET2. PSD2 provides a polarized error signal via signal line 56 to the input of integrator INTEG2 65.

Therefore, two identical servo loops are used to control the CW and CCW beams onto each of their respective cavity resonances. The path length of the second cavity is adjusted by two PZTs. PZT3, 52 is a coarse DC tuning PZT which is used just to bring the second cavity into resonance with the first cavity. PZT2, 35 is a fine control to compensate for the thermal and mechanical drifts in the second cavity. The error signals from INTEG1 and INTEG2 are summed together and this sum integrated by INTEG3 and amplified by AMP3, 82 to drive PZT2, 35. This sum technique doubles the dynamic range of the VCO's taken together and keeps the CW and CCW resonances symmetric about the nonrotating resonant cavity frequency.

Frequency Modulation Stabilization Techniques

Frequency modulation spectroscopic techniques have been recently developed as a means to enhance the signal to noise ratio and obtain finer resolution of weak absorbing lines. In normal phase sensitive detection schemes, the frequency of the input source is dithered or frequency modulated about a small portion (less than the Full Width Half Max, (FWHM) point) of the cavity absorption resonance of interest. Therefore, for a resonance centered at Fo, and a frequency modulation Fm with amplitude "a", the source frequency can be represented as $$F = A*COS(2\pi Fo*t + a*COS\ 2\pi Fm*t)$$

where "a" is the modulation depth (less than the FWHM of the resonance) and "A" is the amplitude of the source. Normally, "a" is small and therefore a Taylor expansion or the equivalent Bessel function expansion for small arguments will give a system response of a DC term and harmonics at 1Fm, 2Fm, 3Fm, etc. For a small "a", the 1Fm term will dominate and phase sensitive detection at Fm will result in a derivative response of the resonance (centered at Fo with FWHM greater than a). This derivative signal has the correct + or − error signal that is readily tractable to a zero seeking servo loop such that at zero signal, the servo is at the peak of the resonance. This frequency stabilization technique works well for most applications but for the utmost in resolution and phase stability, an expanded approach is utilized. Instead of modulating (Fm at depth a) within the FWHM of the resonance, a larger frequency swing (depth) is used to drive the source frequency outside the absorption resonance's FWHM and therefore into the frequency domain where there is little background noise from the resonance signal (large depth a). With higher modulation frequencies Fm (>1MHz), the system operates out of the 1/f noise and low frequency noise spectrum of the frequency source and in the regime of shot noise limited frequency output of the laser. Accordingly, the source frequency will be $$F = A*COS(2\pi Fo*t + a*COS 2\pi Fm*t)$$

where "a" is large ("a" at least 10 times greater FWHM), Fo is the center absorption resonance frequency, and Fm is the modulation frequency (Fm>1MHz). A complete Bessel function expansion of F results in frequencies centered at Fo, Fo+/−nFm where "n" is an integer with amplitudes related to the Bessel functions Jn. For Phase Locked Passive Ring Laser Gyro (PRLG) applications, the modulation depth "a" is picked such that the dominant response is limited to Fo and Fo+/−Fm and all subsequent sidebands are negligible. This frequency modulation process is accomplished by injection of the source Fo into an EO 17 which frequency modulates the light at Fm. In the passive cavity approach Fm is about 10 MHz for a passive cavity having an FWHM of 50 kHz.

As signals Fo, Fo+/−Fm pass through AO1 or AO2, the three frequencies are upshifted in frequency by F1 or F2, respectively to Fo+F1, Fo+/−Fm+F1, or Fo+F2, Fo+/−Fm+F2. Each of these sets of frequencies are injected into the passive cavity 16 as either the CW or CCW beam. The Phase Locked PRLG of FIG. 1 through FIG. 7 shows an embodiment in which the reflected beam 32, 40 detected as opposed to the transmitted beam in alternative passive cavity configurations. A dip in the detector signals via signal lines 34, 64 will appear instead of a resonance peak. The fast response detectors 31 or 63 function as beat frequency detectors and also provide signal information with a DC intensity level. The three frequency components (Fo+F1), (Fo+F1 +/−Fm) mix with each other to produce a beat frequency at Fm (all other frequencies Fo, Fo+/−F1, etc. are too high in frequency>($10^{14}$Hz), to be detected by the rest of the detector servo system). Normally, if there is no background or resonance signal, the photocurrents from the beat signals resulting from the two sidebands +Fm and −Fm are opposite in phase and will cancel out at the photodetector. However, where there is a resonance, after phase sensitive demodulation, a quasi-derivative signal as shown in FIG. 11b will result which provides an error signal having a + or − polarity, herein referred to as a DC error signal, utilized in a zero seeking servo loop. By phase sensitive detecting the resulting +Fm and −Fm signals from detectors 31 and 63 using mixer PSD1 or PSD2, the demodulated DC level signals as shown in FIG. 11b are obtained and utilized in the servo loop via the integrators and amplifiers to maintain CW and CCW resonance.

Note that FIG. 11b represents the resulting PSD DC level output amplitude as the source laser Fo is scanned from at least Fo−Fm to F−+Fm. As the source laser is exactly at Fo, the DC level is zero and there is no error correcting signal to the servo loop.

Cavity and AO Servo Operation

The acousto-optic device is an essential element in the output servo loop. Clockwise light is detected and phase sensitive demodulated to produce a DC error signal comparable to that in FIG. 11b resulting from the frequency modulation stabilization technique. This UC signal is the servo error signal which is integrated and then amplified and fed into a voltage controlled oscillator VCO1 45. The VCO1 output frequency is used to change the frequency that AO1 shifts the CW beam such that the CW beam is brought into the cavity's resonance.

The CCW light is detected and phase sensitive demodulated in its corresponding servo loop. PSD2 provides the demodulated CCW error signal on signal line 56 to the input of INTEG2 65 where it is integrated and amplified and fed into a voltage controlled oscillator VCO2 51. The VCO2 output frequency is used to change the frequency that AO2 shifts the CCW beam such that the frequency of the CCW beam is brought into the cavity's resonance. Therefore, two identical servos are used in the AO, VCO portions of each CW and CCW loop. The input rotation rate to the Phase Locked PRLG sensitive axis is related to the VCO's frequency and is the frequency difference of the frequencies supplied to AO1 and AO2. This frequency F1−F2 difference is counted using counter 71 to form a digital output signal which is scaled to provide a digital representation of the rotation rate about the sensitive axis.

Common Mode

Two acousto-optic devices are used so each beam encounters similar phase shifts. AO2, driven by the VCO2, shifts the CCW light in frequency by F2 related to the input rotation rates; AO1 in the CW beam path driven by VCO1 shifts the CW beam in frequency by F1. By passing the CW light through an acousto-optic device, common mode bias errors are eliminated with respect to the CCW beam.

Although the invention has been disclosed and illustrated in detail, it is to be clearly understood that the same is by way of illustration as an example only and is not to be taken by way of limitation. The spirit and scope of this invention is to be limited only by the terms of the appended claims.

What is claimed is:

1. A phase locked passive ring resonator gyroscope having enhanced stability and sensitivity comprising:
   a fixed frequency reference signal generator to provide a reference signal at a fixed reference frequency (Fm);
   a single piece body having laser and passive resonator cavities;

a laser means having a power source, using said laser resonator cavity containing a lasing medium, said laser means having a first cavity servo path length adjusting means (PZT1) responsive to a laser control signal from a laser servo for providing a single frequency light source (FO) from a transmitting aperture;

means responsive to said single frequency light source and to said reference signal for frequency modulating at said reference frequency ($F_m$), said single frequency light source to form a frequency modulated light source having a center frequency equal to said single frequency light source (FO) and having respective upper and lower side bands at frequencies Fo+Fm and at FO−Fm, respectively;

means for splitting said frequency modulated light source into respective first and second frequency modulated rays;

first voltage controlled oscillator means responsive to a first control signal for frequency shifting said first frequency modulated ray center frequency by a first variable offset frequency (F1) to form a propagating light source (FCW), and for coupling said propagating light into said second resonator cavity to form a propagating light beam (FCW);

said second resonator cavity being a passive high Q evacuated cavity having a path length adjusting means responsive to a passive cavity path length servo signal for adjusting its closed optical path length, the sensitive axis of said passive ring resonator gyroscope being essentially normal to the plane of said closed optical path;

second voltage controlled oscillator means responsive to a second control signal for frequency shifting said second frequency modulated ray by a second variable offset frequency (F2) in response to said second control signal to form a counterpropagating light source, and for coupling said counterpropagating light (FCCW) into said second resonator cavity;

a detector means optically coupled to sample said propagating light beam for detecting a first offset frequency error signal at reference signal frequency (Fm) to provide a first offset frequency error signal, and being optically coupled to sample said counterpropagating beam for detecting a second offset frequency error signal at reference signal frequency (Fm) to provide a second phase error signal;

cavity servo means responsive to said reference signal and to said first and second offset frequency error signals from said detector means for providing, a first control signal to said first voltage controlled oscillator means for frequency shifting said first frequency modulated ray by a first variable offset frequency to maintain said propagating light beam (FCW) in said second resonator at peak resonance by driving the phase difference between said detected first offset frequency error signal and the fixed frequency reference signal to a minimum value, and to provide a second control signal to said second voltage controlled oscillator means for frequency shifting said second frequency modulated ray by a second variable offset frequency (F2) to control and maintain said counterpropagating light beam (FCCW) at peak resonance by driving the phase difference between said detected second phase error signal and the fixed frequency reference signal to a minimum value;

means responsive to said first and second control signals for providing said passive cavity path length servo signal to said passive cavity path length adjusting means and for constantly adjusting said passive cavity path length servo signal to keep said passive cavity at peak resonance at a frequency substantially mid-range between said propagating and said counterpropagating beams;

output counter means for measuring and outputting the frequency difference between said first variable offset frequency (F1) and said second variable offset frequency (F2), the measured frequency difference representing the difference in frequency due to an input gyro body rate about said gyro sensitive axis.

2. The passive ring resonator gyroscope of claim 1 wherein said laser means further comprises:

a means for sampling and detecting said single frequency light source;

a piezoelectric transducer (PZT1) having a mirror surface positioned within said integral first cavity to adjust the pathlength of reflected light within said first cavity, said PZT1 being responsive to said laser control signal to peak adjust the output intensity of the single frequency light leaving said first resonator cavity.

3. The passive ring resonator of claim 2 wherein said means for sampling and detecting said single frequency light source further comprises:

a beam splitter having a receiving aperture responsive to said single frequency light from said first resonator laser means and an aperture for providing a sample of said single frequency light source to a detector means.

4. The passive ring resonator of claim 1 wherein said first voltage controlled oscillator means further comprises:

a first voltage controlled oscillator (VCO1) for providing a first variable offset frequency signal (F1), and;

a first acousto-optic coupler (AO1) responsive to said first frequency modulated ray and to said first variable offset frequency signal for upshifting the frequency of said first frequency modulated ray by a frequency equal to the frequency of said first voltage controlled oscillator output signal and for providing said propagating light source (FCW) to said passive resonator cavity.

5. The passive ring resonator of claim 4 wherein said second voltage controlled oscillator means further comprises:

a second voltage controlled oscillator (VCO2) for providing a second variable offset frequency (F2), and;

a second acousto-optic coupler (AO2) responsive to said second frequency modulated ray and to said second variable offset frequency signal for upshifting the frequency of said second frequency modulated ray by a frequency equal to the frequency of said second voltage controlled oscillator output signal and for providing said propagating light source (FCCW) to said passive resonator cavity.

6. The passive ring resonator of claim 1 wherein said detector means for detecting a first offset frequency error signal at reference frequency Fm and for detecting a second offset frequency error signal at reference frequency Fm to provide respective first and second offset frequency error signals further comprises:

first and second detector diodes and respective first and second detector amplifiers, each detector amplifier being electrically coupled to a respective detector diode and both amplifier and diode being biased to provide a respective first and second offset frequency error signal;

said first detector diode being coupled to be responsive to a sample of said propagating light beam; and said second detector diode being coupled to be responsive to a sample of said counterpropagating light beam; and a first and second phase detector, each respective phase detector being responsive to a respective reference frequency signal and to a respective first offset frequency error signal for providing respective first and second phase error signals.

7. The passive ring resonator of claim 1 wherein said means responsive to said first and second control signals for providing said passive cavity path length servo signal to said passive cavity path length adjusting means and for constantly adjusting said passive cavity path length servo signal to keep said passive cavity at peak resonance at a frequency substantially mio-range between said propagating and said counterpropagating beams further comprises:

an ADDER having a first and second summing input terminals and an output terminal;

said first and second input terminal being respectively coupled to respective first and second phase control signals; and an integrator having an input and output terminal, said integrator input terminal being coupled to said ADDER output terminal, and said integrator output terminal being coupled to provide said passive cavity path length servo signal to said passive cavity path length adjusting means.

8. The passive ring resonator of claim 1 wherein said cavity servo means for providing a first control signal to said means for frequency shifting said first frequency modulated ray by a first variable offset frequency in response to a first phase error signal at reference frequency Fm further comprises:

a first integrator responsive to said first phase error signal for integrating said first phase error signal to provide a first phase control signal; and a first amplifier responsive to said first phase control signal for providing said first control signal;

a second phase detector responsive to said reference frequency signal and to said second offset frequency error signal for providing a second phase error signal;

a second integrator responsive to said second phase error signal for integrating said second phase error signal to provide a second phase control signal; and a second amplifier responsive to said second phase control signal for providing said second control signal.

9. The passive ring resonator of claim 8 wherein said means responsive to said first and second control signals for providing said passive cavity path length servo signal to said passive cavity path length adjusting means and for constantly adjusting said passive cavity path length servo signal to keep said passive cavity at peak resonance at a frequency substantially mid-range between said propagating and said counterpropagating beams further comprises:

an ADDER having a first and second summing input terminals and an output terminal;

said first and second input terminal being respectively coupled to respective first and second phase control signals; and an integrator having an input and output terminal, said integrator input terminal being coupled to said ADDER output terminal, and said integrator output terminal being coupled to provide said passive cavity path length servo signal to said passive cavity path length adjusting means.

10. A phase locked passive ring resonator gyroscope having enhanced stability and sensitivity comprising:

a fixed frequency reference signal generator to provide a reference signal at a fixed reference frequency (Fm);

a single piece body having laser and passive resonator cavities;

a laser means having a power source, using said laser resonator cavity containing a lasing medium, said laser means having a first cavity servo path length adjusting means (PZT1) responsive to a laser control signal from a laser servo for providing a single frequency light source (FO) from a transmitting aperture;

means responsive to said single frequency light source and to said reference signal for frequency modulating at said reference frequency ($F_m$), said single frequency light source to form a frequency modulated light source having a center frequency equal to said single frequency light source (FO) and having respective upper and lower side bands at frequencies Fo+Fm and at FO−Fm, respectively;

means for splitting said frequency modulated light source into respective first and second frequency modulated rays;

first voltage controlled oscillator means responsive to a first control signal for frequency shifting said first frequency modulated ray center frequency by a first variable offset frequency (F1) to form a propagating light source (FCW), and for coupling said propagating light into said second resonator cavity to form a propagating light beam (FCW);

said second resonator cavity being a passive high Q evacuated cavity having a path length adjusting means responsive to a passive cavity path length servo signal for adjusting its closed optical path length, the sensitive axis of said passive ring resonator gyroscope being essentially normal to the plane of said closed optical path;

second voltage controlled oscillator means responsive to a second control signal for frequency shifting said second frequency modulated ray by a second variable offset frequency (F2) in response to said second control signal to form a counterpropagating light source, and for coupling said counterpropagating light (FCCW) into said second resonator cavity;

a detector means optically coupled to sample said propagating light beam for detecting a first offset frequency error signal at reference signal frequency (Fm) to provide a first offset frequency error signal, and being optically coupled to sample said counterpropagating beam for detecting a second offset frequency error signal at reference signal frequency (Fm) to provide a second phase error signal;

cavity servo means responsive to said reference signal and to said first and second offset frequency error signals from said detector means having:
- a first integrator responsive to said first phase error signal for integrating said first phase error signal to provide a first phase control signal; and
- a first amplifier responsive to said first phase control signal for providing said first control signal;
- a second phase detector responsive to said reference frequency signal and to said second offset frequency error signal for providing a second phase error signal;
- a second integrator responsive to said second phase error signal for integrating said second phase error signal to provide a second phase control signal; and
- a second amplifier responsive to said second phase control signal for providing said second control signal;
- a first control signal to said first voltage controlled oscillator means for frequency shifting said first frequency modulated ray by a first variable offset frequency to maintain said propagating light beam (FCW) in said second resonator at peak resonance by driving the phase difference between said detected first offset frequency error signal and the fixed frequency reference signal to a minimum value, and to provide
- a second control signal to said second voltage controlled oscillator means for frequency shifting said second frequency modulated ray by a second variable offset frequency (F2) to control and maintain said counterpropagating light beam (FCCW) at peak resonance by driving the phase difference between said detected second phase error signal and the fixed frequency reference signal to a minimum value;

means responsive to said first and second control signals for providing said passive cavity path length servo signal to said passive cavity path length adjusting means and for constantly adjusting said passive cavity path length servo signal to keep said passive cavity at peak resonance at a frequency substantially mid-range between said propagating and said counterpropagating beams, said means having:
- an ADDER having a first and second summing input terminals and an output terminal;
- said first and second input terminal being respectively coupled to respective first and second phase control signals; and
- an integrator having an input and output terminal, said integrator input terminal being coupled to said ADDER output terminal, and said integrator output terminal being coupled to provide said passive cavity path length servo signal to said passive cavity path length adjusting means.

output counter means for measuring and outputting the frequency difference between said first variable offset frequency (Fl) and said second variable offset frequency (F2), the measured frequency difference representing the difference in frequency due to an input gyro body rate about said gyro sensitive axis.

* * * * *